INVENTORS
THEODORUS B. A. M. SLIEPENBEEK
MANFRED F. K. GAMMEL
BY
Frank R. Trifari
AGENT INVENTOR
J. E. GOELL
BY
A. J. Torsiglieri
ATTORNEY

PHASE CHARACTERISTIC

GAIN CHARACTERISTIC

PHASE CHARACTERISTIC

FIG. 5 is a graph similar to FIG. 4 but for a system or element having cubic phase distortion; and FIG. 6 is a graph of gain versus frequency for an ideal equalizer in accordance with an illustrative embodiment of the invention.

DETAILED DESCRIPTION

Before discussing the invention in detail it may be helpful to review briefly the structure and operation of a conventional baseband transversal equalizer for the purposes of comparison. One form of such an equalizer is shown in FIG. 1 and is disclosed in a number of U.S. Pats., including No. 3,292,110 issued on Dec. 13, 1966 to F. K. Becker et al. and No. 3,368,168 issued on Feb. 6, 1968 to R. W. Lucky. In the former patent a baseband transversal equalizer (or filter) is described as being an example of a time domain network for the correction of distortion in digital data communications systems. The transversal filter, as shown in FIG. 1, comprises a plurally tapped delay line 10 (typically a single wire conductor) having a uniform delay for all frequencies within the passband of the transmission medium and, desirably, a total delay at least as great as the dispersion imposed by the transmission medium upon significant frequency components of signals lying within the transmission passband of the medium. The tap spacing for digital systems is chosen equal to the time interval at which successive signal samples are to be taken, that is, the reciprocal of the baud rate. Each tap is connected to a summing network or bus 12 through a variable resistive attenuator 14 including an inverter (not shown). The effective multiplying factor is preferably adjustable over a range between plus and minus unity. The attenuator at the main tap $\alpha_0$ designated 16 is usually fixed for a reference value and need not include an inverter. The main tap is shown in the center of the delay line, but it may occur in practice at any other tap depending on the lagging or leading relation of the distortion to be corrected. A side tap is any tap other than the main tap. The greater the number of taps, the greater is the range of distortion correction.

The object of the transversal equalizer is to achieve an undistorted pulse at chosen sampling pulse instants, i.e., by adjusting the several attenuators to shape the waveform of the received baseband signal 18 so as to minimize intersymbol interference and thereby produce and equalize output signal 20.

This object is accomplished by multiplying the output from the main tap of the delay line portion by a factor arbitrarily designated unity and the output of all other taps by a factor less than unity such that the contributions of pulses adjacent to the pulse being detected are reduced to as nearly zero as is practicable. Adding together the uncorrected output of the main tap and the corrected outputs of all the side taps leading and lagging the main tap results in a pulse of a desired waveshape. The method of determining the appropriate attenuator settings is now well known and is described briefly in U.S. Pat. No. 3,292,110 and in detail in U.S. Pats. No. 3,289,108 and 3,305,798, all of which are assigned to applicant's assignee.

By way of comparison, FIG. 2 shows schematically one form of a transversal equalizer for equalizing distortion in information signals at carrier frequencies. A carrier input signal 22 is coupled into the equalizer through a hybrid 24. A plurality N of modules 26 are connected in parallel via hybrids such as 28 and 30 to the upper and lower portions of the transmission path, typically a waveguide or stripline. Each module includes, in series, an attenuator $\alpha$, a time-delay element $\tau$ and a phase shifter $\Phi$. Each of these elements is well-known to those skilled in the art and will therefore be described only briefly here. In a waveguide system the attenuator could comprise, for example, a sheet of resistive material adjustably inserted through the sidewall of the waveguide into the region of high field. Similarly, the phase shifter could consist of a dielectric sheet inserted through the sidewall. However, such a simple phase shifter is often inadequate in sophisticated systems which often require phase shifters which incorporate mode converters such as the Hewlett-Packard X885A. On the other hand, the time-delay element can be merely a predetermined length of waveguide or other transmission line.

As with the baseband equalizer, distortion is removed on a time domain basis by combining the delay and attenuated outputs of the side taps with an original signal transmitted essentially unaltered through an arbitrarily selected main tap. Disadvantageously, however, phase shifters are required in order to properly adjust the phase of the carrier within each time slot. As mentioned previously, such phase shifters, though well known in the art, are difficult and expensive to fabricate.

It has been discovered that the need for phase shifters in such carrier transversal equalizers may be eliminated if the equalizer is designed such that the carrier frequency, bandwidth, and natural periodicity of the equalizer are appropriately related. Thus, as shown in FIG. 3, in accordance with an illustrative embodiment of the invention, a transversal equalizer comprises a plurality N of modules 32 connected in parallel via hybrids 34 and 36, for example, across the upper and lower transmission paths 38 and 40, respectively, of a transmission system. In a symmetrical approximation for quadratic phase distortion, phase shifters are not required provided that equation (1) is satisfied. This criterion can be easily understood with reference to FIG. 4.

The periodic curve $\Phi_E$ is a graph of phase versus frequency for the transversal equalizer. Due to the truncated periodic structure of the equalizer, the phase $\Phi_E$ varies periodically, shown to have a period $2\Delta f$. The transmission system or component is shown to introduce quadratic phase distortion as indicated by the parabola $\Phi_S$, which is a typical inverted phase characteristic of a waveguide, for example. Equalization is desired over a band of $\Delta f$ centered illustratively at a frequency $2.5f_b$. Consequently, $m=2$ in equation (1) and therefore the frequency of the carrier transmitted through the equalizer is $f_c=2.5\Delta f=2.5f_b$. While $\Delta f$ is shown illustratively to cover one-half of a period of $\Phi_E$ centered at $2.5f_b$, it is quite feasible that $\Delta f$ could be less than one-half period. In such a case, however, $\Delta f$ would be less than $f_b$ resulting in the need for fewer taps but also causing incomplete equalization. When it is desired to avoid this, $\Delta f$ should be at least as great as $f_b$. In fact, if the use of additional taps is consistent with design criteria, $\Delta f$ can be made greater than $f_b$, thus allowing the equalization of information outside the band defined by $f_b$, where a small fraction of the information content of the signal may be situated.

Furthermore, while in FIG. 4 $f_c$ is shown to be equal to $2.5f_b$, it could just as well be equal larger multiples of $f_b$. A choice, however, of $\Delta f=0.5f_b$ would be desirable only where the time crosstalk due to the inclusion of negative frequencies in down conversion operations can be tolerated.

An inspection of the transversal equalizer of FIG. 3 indicates that due to the use of directional couplers each module is isolated and hence the structure is inherently impedance-matched, an essential requirement at high frequencies. Furthermore, it is apparent that additional delay elements can be inserted in the upper and lower transmission paths 38 and 40 in order to reduce the total amount of delay line required. Adjustment of the equalizer to reduce distortion is greatly simplified, since signal portions of a given delay travel through separate arms (i.e., modules) of the equalizer.

Similarly, FIG. 5 shows the manner in which the periodic phase function $\Phi_E$ of an equalizer in accordance with the invention can be utilized to approximate cubic phase distortion as indicated by the curve $\Phi_s$. Illustratively, the carrier frequency $f_c$ is chosen to be $2f_b$ and $\Delta f=f_b$. Thus in equation (2), $m=2$. It should be noted that if an odd integer were chosen for $m$ (e.g. $m=1$ and $f_c=f_b$), the sign of the slope of $\Phi_E$ would be opposite to that of $\Phi_s$ and hence equalization could not be achieved for the particular $\Phi_s$ shown. Of course, if the slope of $\Phi_s$ were negative, then $m$ would be *even*.

In addition, the equalizer described herein is comparatively efficient. With the attenuators set to zero, the maximum power efficiency $\eta_{max}$ is given by $$\eta_{\max} = 4N \frac{(N-1)^{N-1}}{(N+1)^{N+1}} \qquad (5)$$

CARRIER TRANSVERSAL EQUALIZER

BACKGROUND OF THE INVENTION

This invention relates to transversal equalizers and, more particularly, to such equalizers for equalizing phase distortion in information signals at carrier frequencies.

It has been said that one of the primary advantages in pulse code modulation transmission is the ability to reconstruct a transmitted pulse after it has traveled through a dispersive, noisy medium. The process of regenerating a pulse train at intervals along a transmission path is performed by regenerative repeaters which perform three basic functions: reshaping, timing, and regeneration. The first of these functions, reshaping, is generally accomplished in part by an equalizer within the repeater. This invention is directed generally to improvements in such equalizers.

Sophisticated microwave PCM transmission systems, such as frequency-modulated binary differentially coherent phase-shift keyed (FM-BDCPSK) systems, have recently been advanced by W. D. Warters. See, for example, U.S. Pat. application, Ser. No. 568,893, filed July 29, 1966 and (now U.S. Pat. No. 3,492,576 issued on Jan. 27, 1970) and assigned to applicants assignee. Such systems are plagued by many of the problems, such as phase distortion, common to amplitude modulated PCM transmission systems (conventional systems). While some of the conventional solutions are theoretically applicable to the more sophisticated systems, others are not. For example, it is common to equalize phase distortion in conventional carrier PCM signals by means of baseband transversal equalizers. As the name implies, the equalization occurs at baseband (i.e., at DC) and therefore necessitates the removal of the carrier. Since the transmission system is linear in amplitude, the carrier removal process must also be linear in amplitude.

It is desirable in more sophisticated transmission systems, as well as in many conventional systems, to perform the equalization at carrier frequencies, thereby obviating the need for synchronous carrier removal equipment in each channel at each repeater station for the conventional systems and, in addition, allowing the simultaneous retention of phase and amplitude information for the more sophisticated systems. To do so, however, generally requires the insertion of phase shifters in the transversal equalizer to adjust the phase of the carrier within each time slot (e.g. in a PCM system). Unfortunately, such phase shifters can be difficult and expensive to fabricate.

It is therefore a broad object of this invention to equalize the phase distortion in a carrier information signal.

It is another object of this invention to equalize the phase distortion of a carrier signal without carrier removal.

It is still another object of the present invention to equalize phase distortion in signals at carrier frequencies without the use of phase shifters.

In some transmission systems and components thereof the phase distortion produced is quadratic in nature, i.e., primarily second order. For example, the typical phase characteristic (versus frequency) of a conventional waveguide is approximately linear (the ideal characteristic) only above a certain frequency. Below that frequency, and above the cutoff frequency of the waveguide, the characteristic is curvilinear and predominantly quadratic, giving rise to quadratic phase distortion. This distortion manifests itself illustratively by producing "tails" on each pulse which overlap the pulses in adjacent time slots or even in nonadjacent slots. This type of distortion is commonly known as intersymbol interference and is a form of objectionable crosstalk.

It is consequently yet another object of this invention to equalize quadratic phase distortion in microwave signals at carrier frequencies.

Another problem of transversal equalizers involves the separation of the signal into several components after suitable delay without introducing impedance mismatches and endless loops. At baseband, it is virtually impossible to avoid these difficulties without the use of active elements with their attendant high cost for large bandwidth systems.

It is therefore an object of the present invention to equalize phase distortion in signals at carrier frequencies by means of apparatus which is loop-free and is readily impedance-matched to the transmission system carrying these signals.

SUMMARY OF THE INVENTION

These and other objects are accomplished in the transversal equalizer of the invention which, in one illustrative embodiment, includes a plurality of parallel modules each coupled across a transmission line by means of separate hybrids equally spaced along the line. Each module extracts or "taps" a portion of the signal from the line and operates upon it to reduce distortion in the overall signal. The number of such taps, and hence the number of parallel modules, is determined by system design criteria such as the carrier frequency. Generally, for waveguide systems, a lower carrier frequency ($f_c$) requires more taps (N) since as $f_c$ approaches the cutoff frequency of the transmission line, the phase nonlinearity, and hence the distortion, increases.

In accordance with the invention, each module comprises the series combination of an attenuator and a time-delay element, and the structure due to the use of hybrid microwave couplers is inherently impedance-matched and loop-free. In a symmetrical approximation for quadratic phase distortion (e.g. in a waveguide), the invention eliminates the need for phase shifters in each module by adapting the equalizer such that the design frequency $f_e$ of the equalizer is given by $$f_e=(m+\tfrac{1}{2})\Delta f, \qquad (1)$$

where $\Delta f$ is bandwidth over which equalization is desired and $m$ is an appropriate integer including zero. Equation (1) holds true for all cases of even-ordered phase distortion, but in the case of quadratic waveguide phase distortion $m$ would be an even integer. Since $f_c$, the frequency of the carrier at the transmitter and $f_e$ need not necessarily be equal, in many systems the carrier frequency $f_c$ is translated so that when the carrier is transmitted through the equalizer $f_c=f_e$ and equation (1) is satisfied. Typically, $\Delta f$ might be equal to the baud rate, $f_b$, and $f_e=2.5\Delta f$, i.e., $m=2$ and $\Delta f$ ranges from $2f_b$ to $3f_b$. The "baud" rate is to be distinguished from the "bit" rate. The latter is the rate of information transmission whereas the former is the pulse repetition rate. In a binary transmission system the two are equal, but in higher order systems the bit rate is greater than the baud rate.

In a system in which the phase distortion is primarily odd ordered (e.g. cubic), the frequency $f_c$ is given by $$f_e=n\Delta f \qquad (2)$$

where $n$ is an integer.

The attenuator settings in either case are determined in any conventional way (e.g., by numerical analysis from the Fourier series for the desired equalizer transfer function) and the time-delay separations T are uniform and given by $$T=1/2\Delta f, \qquad (3)$$

or in the case where $\Delta f$ is equal to the baud rate, $f_b$, $$T=1/2f_b. \qquad (4)$$

More generally, an equalizer complex gain function can be realized without phase shifters if it is periodic and the phase response $\Phi(\omega)$ is odd about the origin, i.e., $\Phi(\omega)=-\Phi(-\omega)$, and the amplitude response $(A(\omega)$ is even about the origin, i.e., $A(\omega)=A(-\omega)$, where the gain in a passive equalizer, such as the one described herein, would be less than unity.

BRIEF DESCRIPTION OF THE DRAWINGS

These and other objects of the invention, together with its various features and advantages, can be easily understood from the following more detailed description taken in conjunction with the accompanying drawings, in which.

where $N$ is the number of taps (or modules).

This expression can be readily derived by well-known mathematical analysis by expressing the output power as a function of coupling coefficient and maximizing the expression with respect to coupling coefficient. The efficiency of this equalizer is greater than that obtainable in a matched resistor divider network.

Generalizing the foregoing, the transmission system phase function can be approximated over a finite frequency band by a Fourier series. Thus, the desired complex equalizer transfer function F(ω), can be written as $$F(\omega)=\sum_{k=-\infty}^{\infty} c_k e^{jk\omega T}, \qquad (6)$$

where $T$ is at most the reciprocal of the bandwidth $\Delta f$ over which equalization is required and where $$c_k=\frac{T}{2\pi}\int_{-\pi/T}^{\pi/T} F(\omega)e^{-jk\omega T}d\omega. \qquad (7)$$

Equation (6) is the transfer function of a transversal equalizer with tap (i.e., time-delay) separation $T$ and tap gain $c_k$ (See Proc. IRE, p. 359, June 1939, by C. R. Burrows). Since the phase of the transfer function of a realizable network is odd about the origin, the $c_k$ 's will be real for an equalizer designed to have a transfer function whose phase is odd about the origin and whose amplitude is even about the origin.

Figure 1:
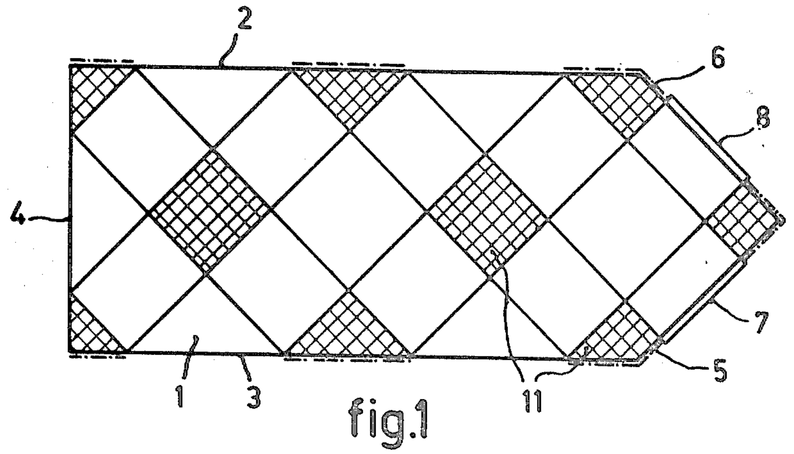
FIG. 1 is a schematic of a prior art baseband transversal equalizer.
Figure 2:
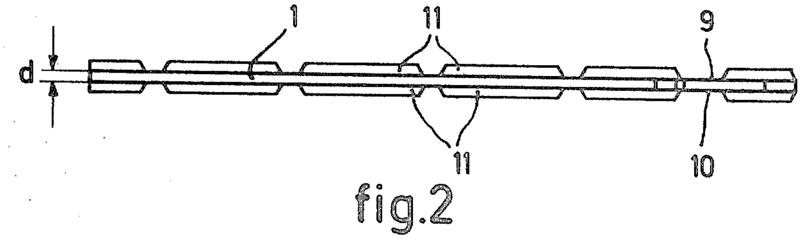
FIG. 2 is a schematic of a microwave carrier transversal equalizer utilizing phase shifters.
Figure 1:
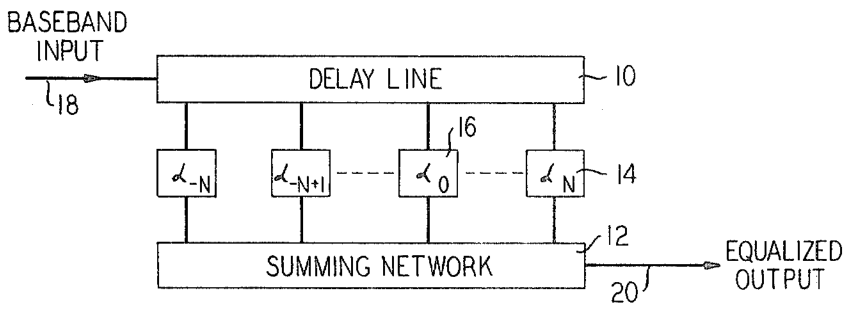
FIG. 1 (PRIOR ART)
Figure 2:
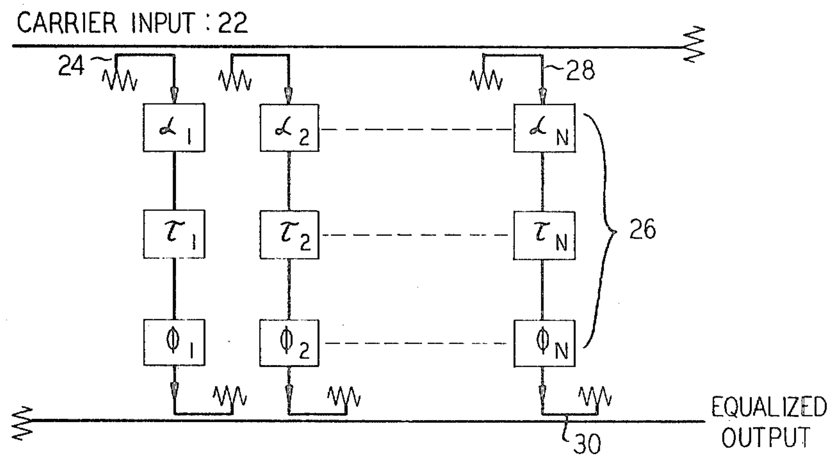
Figure 3:
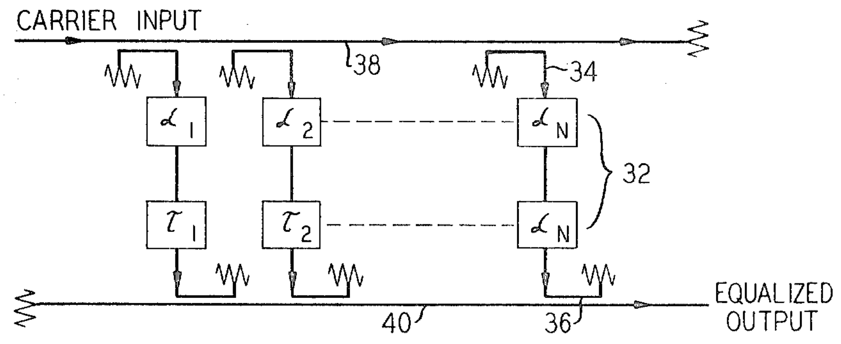
FIG. 3 is a schematic of a microwave carrier transversal equalizer in accordance with the invention.
Figure 4:
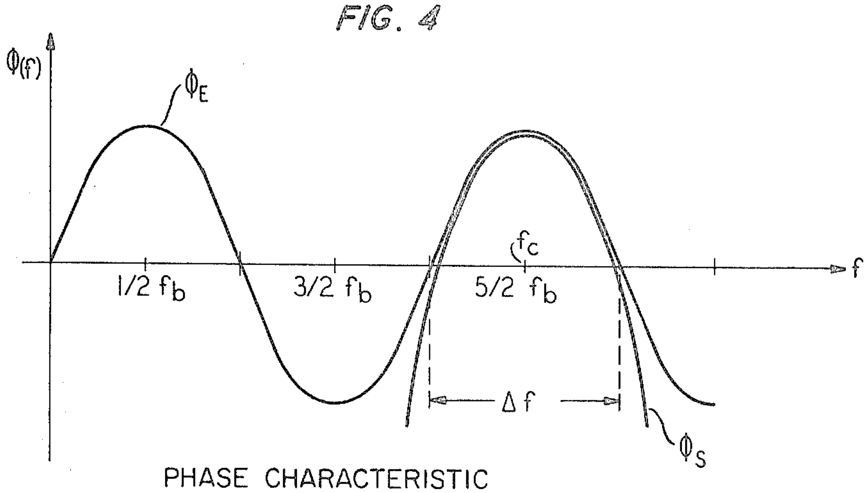
FIG. 4 is a graph of phase versus frequency for both an equalizer having a symmetrical periodic phase characteristic and a system or element having quadratic phase distortion.
Figure 6:
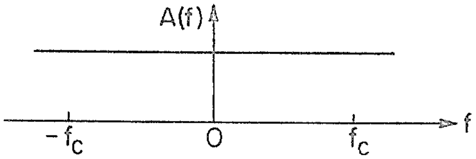
Figure 5:
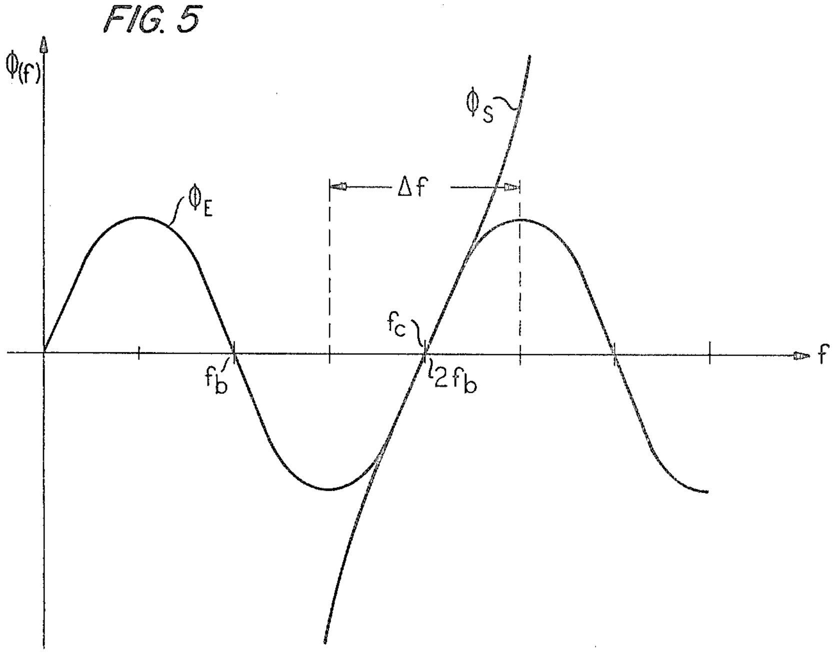

Equalizers of the type shown in FIGS. 2 and 3 can be readily designed to equalize a 300 mb/s binary signal distorted by transmission over 15 miles of 2-inch diameter $TE_{01}$ waveguide at frequencies above about 50 GHz (below about 50 GHz for this size waveguide it has been found that the number of taps would be excessive). On the other hand, under similar conditions, above about 70 GHz equalizers with from three to five taps yield more than adequate equalization of phase distortion.

It is understood that the above-described arrangements are merely illustrative of the many possible specific embodiments which can be derived to represent application of the principles of the invention. Numerous and varied other arrangements can be devised in accordance with these principles by those skilled in the art without departing from the spirit and scope of the invention. In particular, where the phase distortion is both of even and odd orders, the appropriate choice of $f_c$ would be between the $f_c$ determined by equations (1) and (2), with the precise $f_c$ dependent upon system performance criteria.

What is claimed is:

1. For use in a transmission system which translates information signals at a carrier frequency $f_c$ and which is characterized by the introduction of phase distortion in said signals, a transversal equalizer comprising
   means for directing portions of said signal into a plurality of separate transmission paths,
   means in each of said paths for controllably attenuating said signal portion therein,
   means in each of said paths for controllably time delaying said signal portion therein, and characterized in that
   the combination of said directing, attenuating and time-delaying means is adapted so that the phase characteristic of said equalizer is periodic in frequency and odd about the origin and the gain characteristic of said equalizer is even about the origin.

2. The equalizer of claim 1 wherein said distortion is primarily even ordered and wherein the design frequency $f_e$ of said equalizer satisfies approximately the following relationship: $f_e=(m+½)\ \Delta f$, where $\Delta f$ is the bandwidth over which equalization is desired and $m$ is an integer, and means for translating said carrier frequency from $f_c$ to $f_e$.

3. The equalizer of claim 2 wherein said system is a waveguide transmission system which introduces primarily quadratic phase distortion and wherein $m$ is an even integer.

4. The equalizer of claim 2 wherein said directing means comprises
   an input and an output terminal,
   a plurality of modules connected in parallel between said terminals, each of said modules comprising the series combination of said attenuating means and said time delay means.

5. The equalizer of claim 4 wherein the attenuation level of each of said attenuating means is equal approximately to a corresponding Fourier coefficient of the Fourier series of the transfer function of the component of said system producing the phase distortion.

6. The equalizer of claim 5 wherein the difference in delay of adjacent time-delay means is equal approximately to $1/2\Delta f$.

7. The equalizer of claim 6 wherein the phase characteristic of said equalizer is characterized by periodicity of $2f_b$, where $f_b$ is the baud rate, and the bandwidth $\Delta f$ is equal to $f_b$.

8. The equalizer of claim 1 wherein said distortion is primarily odd ordered and wherein the design frequency $f_e$ of said equalizer satisfies approximately the following relationship: $f_e=n\Delta f$ where $\Delta f$ is the bandwidth over which equalization is desired and $n$ is an integer.

9. The equalizer of claim 8 wherein said directing means comprises
   an input and an output terminal,
   a plurality of modules connected in parallel between said terminals, each of said modules comprising the series combination of said attenuating means and said time-delay means.

10. The equalizer of claim 9 wherein the attenuation level of each of said attenuating means is equal approximately to a corresponding Fourier coefficient of the Fourier series of the transfer function of the component of said system producing the phase distortion.

11. The equalizer of claim 10 wherein the difference in delay of adjacent time-delay means is equal approximately to $1/2\Delta f$.

12. The equalizer of claim 11 wherein the phase characteristic of said equalizer is characterized by a periodicity of $2f_b$, where $f_b$ is the baud rate, and the bandwidth $\Delta f$ is equal to $f_b$.

13. A waveguide transmission system comprising
   a waveguide transmission path in at least a portion of which quadratic phase distortion is disadvantageously introduced,
   a transversal equalizer in said path comprising input and output terminals, a plurality of modules connected in parallel between said terminals, each of said modules comprising attenuation and time-delay means, the attenuation level of each of said attenuation means being equal to a corresponding Fourier coefficient of the Fourier series of the transfer function of the quadratic phase distortion portion of said path, the difference in delay of adjacent time-delay means being equal to $1/2\Delta f$, where $\Delta f$, the bandwidth over which equalization is desired, is equal to the baud rate of said system, and wherein said attenuation and time-delay means are adapted so that the design frequency $f_e$ of said equalizer satisfies approximately the following relationship: $f_e=(m+½)\ \Delta f$, $m$ being an even integer.

14. A method of equalizing phase distortion in information signals at carrier frequencies comprising the steps of:
   directing portions of said signal through an equalizer and into a plurality of separate transmission paths therein,
   controllably attenuating said signal portions in each of said paths,
   controllably time delaying said signal portions in each of said paths,
   performing each of said directing, attenuating and time-delaying steps so as to produce in said equalizer a phase characteristic periodic in frequency and odd about the origin and a gain characteristic even about the origin.

15. The method of claim 14 wherein said performing step includes the additional steps of:
   attenuating said signals by an amount equal approximately to a corresponding Fourier coefficient of the Fourier series of the transfer function of the component producing the phase distortion, and time delaying said signal portions such that the difference in delay of adjacent portions is equal approximately to $1/2\Delta f$ where $\Delta f$ is the bandwidth over which equalization is desired.

16. The method of claim 15 wherein said distortion is primarily even ordered and said performing step includes adjusting the equalizer design frequency $f_e$ to satisfy approximately the relationship $f_e=(m+\frac{1}{2})\,\Delta f$, where $\Delta f$ is the bandwidth over which equalization is desired and $m$ is an integer.

17. The method of claim 16 wherein said distortion is quadratic waveguide phase distortion and $m$ is an even integer.

18. The method of claim 15 wherein said distortion is primarily odd ordered and said performing step includes adjusting the equalizer design frequency $f_e$ to satisfy approximately the relationship $f_e=n\Delta f$ where $\Delta f$ is the bandwidth over which equalization is desired and $n$ is an integer.